US010723379B2

(12) United States Patent
Naik et al.

(10) Patent No.: US 10,723,379 B2
(45) Date of Patent: Jul. 28, 2020

(54) STEER-BY-WIRE FEEDBACK TORQUE

(71) Applicant: Ford Global Technologies, LLC, Dearborn, MI (US)

(72) Inventors: Anand Pradip Naik, Royal Oak, MI (US); Darrel Alan Recker, Ypsilanti, MI (US); Steven R. El Aile, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 91 days.

(21) Appl. No.: 16/042,131

(22) Filed: Jul. 23, 2018

(65) Prior Publication Data
US 2020/0023893 A1    Jan. 23, 2020

(51) Int. Cl.
*B62D 6/00* (2006.01)
*B62D 5/00* (2006.01)
*B62D 15/02* (2006.01)
*B62D 5/04* (2006.01)

(52) U.S. Cl.
CPC ............ *B62D 6/008* (2013.01); *B62D 5/006* (2013.01); *B62D 15/0215* (2013.01); *B62D 5/046* (2013.01)

(58) Field of Classification Search
CPC .... B60D 6/008; B60D 15/0215; B60D 5/006; B60D 5/046
See application file for complete search history.

(56) References Cited

U.S. PATENT DOCUMENTS

| 6,059,068 | A | 5/2000 | Kato et al. |
| 6,097,286 | A | 8/2000 | Discenzo |
| 6,535,806 | B2 | 3/2003 | Millsap et al. |
| 6,678,596 | B2 | 1/2004 | Husain et al. |
| 7,234,563 | B2 | 6/2007 | Ogawa et al. |
| 7,908,056 | B2 | 3/2011 | Hwang |
| 2003/0169003 | A1* | 9/2003 | Cao ......... B62D 5/092 318/432 |
| 2017/0232998 | A1* | 8/2017 | Ramanujam ......... B62D 5/0463 701/42 |
| 2019/0084611 | A1* | 3/2019 | Klein ..................... B62D 5/006 |

* cited by examiner

*Primary Examiner* — Anne Marie Antonucci
(74) *Attorney, Agent, or Firm* — Raymond L. Coppiellie; Bejin Bieneman PLC

(57) ABSTRACT

A system includes a computer programmed to specify, while a vehicle is turning, a feedback torque based on a steering torque applied to a steering rack and a difference between a desired angle and an actual angle of vehicle steerable wheels. The computer is further programmed to actuate feedback torque to a vehicle steering wheel.

18 Claims, 4 Drawing Sheets

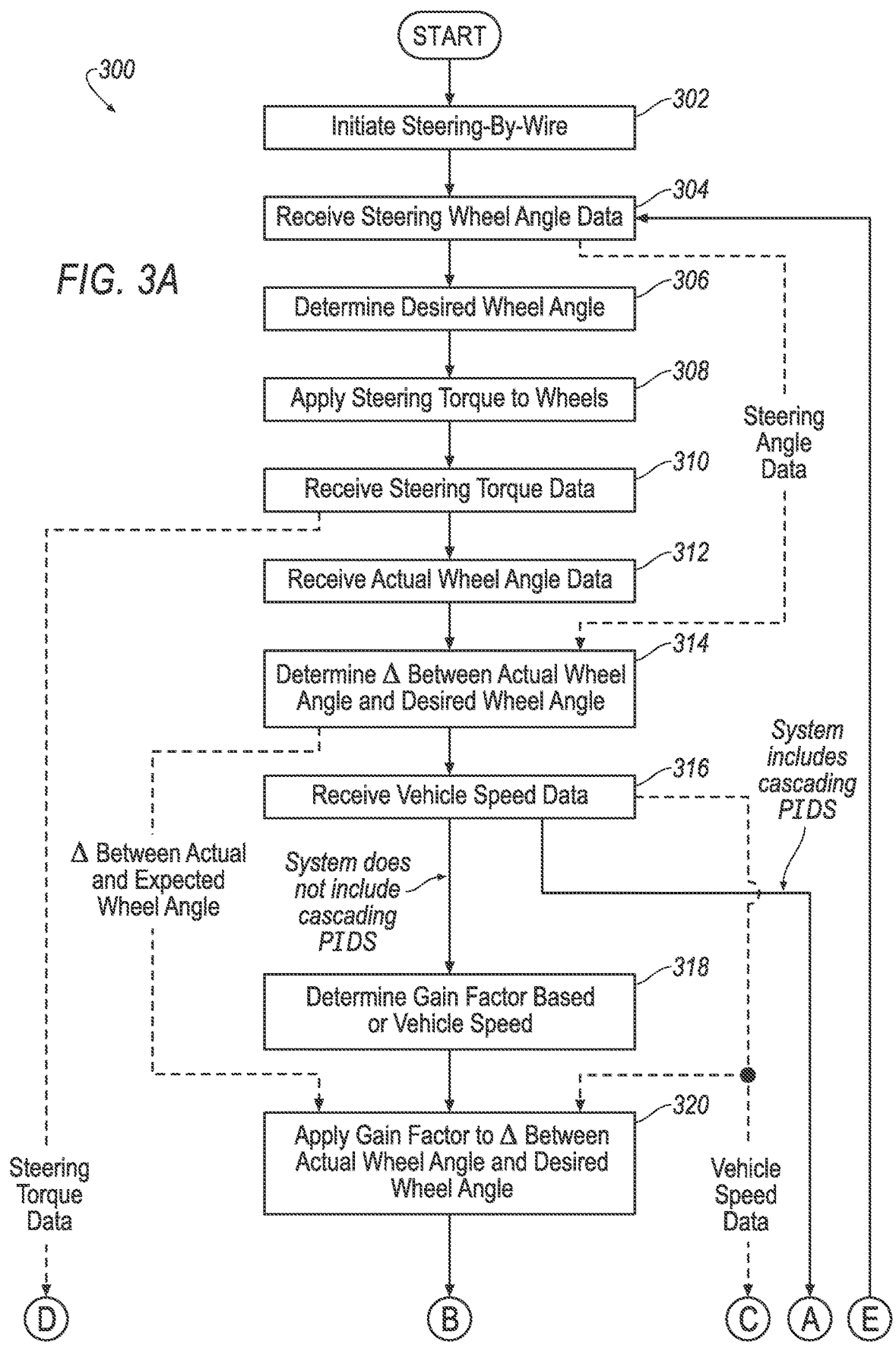

STEER-BY-WIRE FEEDBACK TORQUE

BACKGROUND

Steer-by-wire systems generally lack a mechanical connection between a vehicle's steering wheel and the vehicle's steerable wheels. Due to this absence of mechanical connection, steering wheels in steer-by-wire systems do not receive mechanical feedback from a road surface. To compensate for the lack of direct or mechanical feedback, steer-by-wire systems typically include a steering torque feedback actuator to apply a steering feedback torque to the steering wheel that simulates road feel, i.e., torque that would be applied to the steering wheel and experienced by a driver based on current road conditions, vehicle speed, etc. In addition to road feel, mechanical steering systems further provide feedback for other phenomena that can be experienced during vehicle operation, for example, when vehicle wheels are not turning as expected. For example, a steering wheel may become more difficult to turn when steerable wheels are stuck in mud, a steerable wheel is flat, etc.

BRIEF DESCRIPTION OF THE DRAWINGS

FIGS. 3A and 3B are a diagram of an example process for applying feedback torque to a steering wheel in a steer-by-wire system.

DETAILED DESCRIPTION

Figure 1:
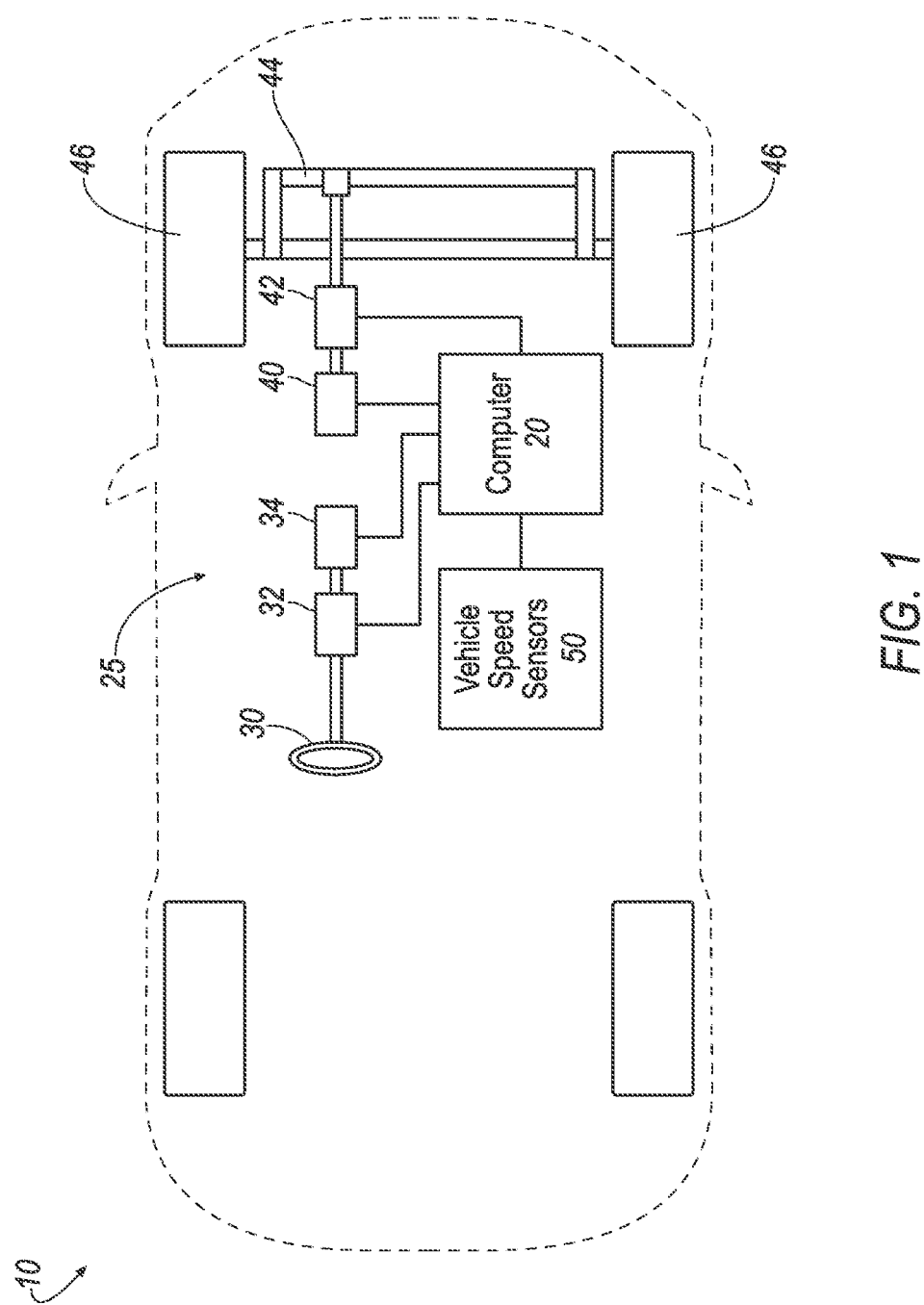
FIG. 1 is a block diagram of an example vehicle including a steer-by-wire system.

A system includes a computer including a processor, and a memory storing instructions executable by the processor. The computer is programmed to specify, while a vehicle is turning, a feedback torque based on a steering torque applied to a steering rack and a difference between a desired angle and an actual angle of vehicle steerable wheels. The computer is further programmed to actuate feedback torque to a vehicle steering wheel.

The system can include an actuator to apply the feedback torque to the steering wheel.

The computer can further be programmed to specify the feedback torque based on a vehicle speed.

The computer can further be programmed to specify the feedback torque further based on a wheel angle velocity of the vehicle steerable wheels.

The computer can further be programmed to receive an actual angle of the vehicle steerable wheels relative to the longitudinal axis of the vehicle respectively at two or more times, and determine the wheel angle velocity of the vehicle steerable wheels based on the actual angles at the respective two or more times.

The computer can further be programmed to apply a first proportional-integral-derivative control function to the difference between the desired angle and the actual angle of the vehicle steerable wheels relative to straight, wherein specifying the feedback torque is based on an output of the first proportional-integral-derivative control function.

The computer can further be programmed to determine a difference between a wheel angle velocity of the vehicle steerable wheels and the output of the first proportional-integral-derivative control function, wherein specifying the feedback torque is based on the difference between the wheel angle velocity of the vehicle steerable wheels and the output of the first proportional-integral-derivative control function.

The computer can further be programmed to apply a second proportional-integral-derivative control function to the difference between the wheel angle velocity and the output of the first proportional-integral-derivative control function, wherein specifying the feedback torque is based on an output of the second proportional-integral-derivative control function.

The computer can further be programmed to receive a steering angle of the steering wheel relative to straight, and determine the desired angle of the vehicle steerable wheels relative to straight.

The system can further include an actuator configured to apply the steering torque to the steering rack, wherein the computer is further programmed to command the actuator to apply the steering torque to the steering rack based on the desired angle of the vehicle steerable wheels relative to straight.

A method includes specifying, by a computer, while a vehicle is turning, a feedback torque based on a steering torque applied to a steering rack and a difference between a desired angle and an actual angle of vehicle steerable wheels. The method further includes actuating feedback torque to a vehicle steering wheel.

The method can further include applying, by an actuator, the feedback torque to the steering wheel.

The method can further include specifying the feedback torque based on a vehicle speed.

The method can further include specifying the feedback torque further based on a wheel angle velocity of the vehicle steerable wheels.

The method can further include receiving an actual angle of the vehicle steerable wheels relative to the longitudinal axis of the vehicle respectively at two or more times, and determining the wheel angle velocity of the vehicle steerable wheels based on the actual angles at the respective two or more times.

The method can further include applying a first proportional-integral-derivative control function to the difference between the desired angle and the actual angle of the vehicle steerable wheels relative to straight, wherein specifying the feedback torque is based on an output of the first proportional-integral-derivative control function.

The method can further include determining a difference between a wheel angle velocity of the vehicle steerable wheels and the output of the first proportional-integral-derivative control function, wherein specifying the feedback torque is based on the difference between the wheel angle velocity of the vehicle steerable wheels and the output of the first proportional-integral-derivative control function.

The method can further include applying a second proportional-integral-derivative control function to the difference between the wheel angle velocity and the output of the first proportional-integral-derivative control function, wherein specifying the feedback torque is based on an output of the second proportional-integral-derivative control function.

The method can further include receiving a steering angle of the steering wheel relative to straight; and determining the desired angle of the vehicle steerable wheels relative to straight.

The method can further include applying the steering torque to the steering torque by an actuator; and commanding the actuator to apply the steering torque to the steering rack based on the desired angle of the vehicle steerable wheels relative to straight.

As disclosed herein, it is possible to specify a feedback torque to a steering wheel in a vehicle, and to actuate the steering wheel based on the specified feedback torque, in a steer-by-wire system. For example, operating conditions in a steer-by-wire system can result in an underperformance condition that otherwise might not be indicated in the vehicle, e.g., to an occupant or driver. Based on a steering torque applied to a steering rack and a deviation of the steering torque below a minimum torque, a steering wheel feedback torque can be determined, and applied to a steering wheel. Thus, in lieu of or in addition to a steering wheel exhibit feedback based on mechanical linkages, it is possible to actuate a steering wheel to provide feedback concerning possible faults, problems, or underperformance conditions in a vehicle.

FIG. 1 is a block diagram of a vehicle 10 including a steer-by-wire sub-system 25. and a computer 20. "Steer-by-wire" means to control the direction and lateral (i.e., side-to-side) movement of vehicle 10 steerable wheels 46 by one or more electronic control units (ECUs), including or communicatively coupled to actuators such as electric motors, based on inputs from a driver. The driver may be a human driver providing inputs via an input device such as a steering wheel or joy stick. Alternatively, the driver may be a virtual driver in a computer based, autonomous driving system that provides digital input. The steer-by-wire subsystem 25 in the vehicle 10 includes a steering wheel 30, steering sensors 32, a steering wheel torque actuator 34, a road wheel actuator 40 and road wheel sensors 42. The vehicle 10 further includes a steering rack 44, steerable wheels 46 and vehicle speed sensors 50.

The vehicle 10 may be capable of autonomous, semi-autonomous or non-autonomous modes of operation. An autonomous mode is defined as one in which the propulsion (typically via a powertrain including one or more electric motors and/or one or more internal combustion engines), braking, and steering are all controlled by one or more computers. A semi-autonomous mode is one in which at least one of vehicle propulsion (typically via a powertrain including an electric motor and/or internal combustion engine), braking and steering are control by one or more computers as opposed to a human operator. A non-autonomous mode is defined as one in which each of vehicle propulsion, braking and steering are controlled by a human operator.

The computer 20 is one or more microprocessor-based computers. The computer 20 includes memory, at least one processor, etc. The memory of the computer 20 includes memory for storing instructions executable by the processor as well as for electronically storing data and/or databases.

The computer 20 may transmit and receive data through a communications network, which may be a controller area network (CAN) bus, Ethernet, WiFi, Local Interconnect Network (LIN), onboard diagnostics connector (OBD-II), and/or by any other wired or wireless communications network. The computer 20 is communicatively coupled with each of the steering sensors 32, the steering wheel torque actuator 34, the road wheel actuator 40, the road wheel actuator sensors 42 and the vehicle speed sensors 50 via the communications network.

The steering wheel 30 is typically a conventional a rigid ring (i.e., a circle), but could be of any suitable shape or configuration. In any event, the steering wheel 30 allows an operator to steer the vehicle 10 by applying rotational force to the steering wheel 30. Steering sensors 32 detect a steering wheel angle of the steering wheel 30 relative to a predefined nominal or home orientation, i.e., an angular rotational position or orientation at which the steering wheel angle is defined to be zero. The steering wheel angle can be defined to be negative when the steering wheel is rotated in a first direction, e.g., counter-clockwise, and positive when rotated in a second direction, e.g., clockwise. Typically, the home position is the straight-away position, i.e., the position at which the steering angle of steerable wheels should, at least ideally, also be zero. Put another way, the straight-away position of the steering wheel 30 is a position corresponding to the vehicle 10 travelling straight away, along the longitudinal axis of the vehicle 10.

The steering sensors 32 can provide the steering wheel angle to the computer 20. In addition to detecting the steering angle, the steering sensors 32 may detect other parameters related to motion of the steering wheel such as acceleration and vibration. As an example, the steering sensors 32 may include an accelerometer mounted on (or within) the steering wheel 30, or on a column supporting the steering wheel 30.

The steering sensors 32 can include a computer such as an electronic control unit (ECU) or the like, programmed to communicate on a vehicle bus and, for example, send commands to and/or receive commands from the computer 20. The steering sensors 32 may include one or more position sensors arranged to detect the steering wheel angle of the steering wheel 30. The position sensors may be, e.g., a Hall effect sensor, a rotary encoder, etc. The steering sensor 32 detects the steering wheel angle and provides steering data to the computer 20 based on the detected steering wheel angle.

The steering wheel torque actuator 34 may be a conventional torque actuator including a computer such as an electronic control unit (ECU) or the like, programmed to communicate on a vehicle bus and, for example, send commands to and/or receive commands from the computer 20. The steering wheel torque actuator 34 includes one or more electromechanical actuators coupled to the steering wheel 30. For example, an included electromechanical actuator may be an electric motor. The road wheel actuator 40 can execute one or more commands from the computer 20 to apply a torque, e.g., to provide feedback to an operator or driver, to the steering wheel 30. As described in additional detail below, the steering wheel feedback torque can be specified based on at least two factors.

A first factor of the steering wheel feedback torque can be based on a steering torque applied to the steerable wheels 46 during a turning operation. The steering torque is the torque applied by the road wheel actuator 40 to turn the steerable wheels 46 from side-to-side. The steering torque can be estimated based on (1) the road wheel actuator 40 motor currents, (2) a vehicle model that uses an angle of the steerable wheels (angle relative to straight), a wheel angle velocity, vehicle's speed, yaw rate, lateral acceleration and other road wheel actuator 40 characteristics, (3) direct measurement by a torque or force sensor integrated in the road wheel actuator 40 or (4) a combination of two or more of these methods.

A second factor of the steering wheel feedback torque can be a feedback torque adjustment factor. The feedback torque adjustment factor is based on a deviation of the performance of the road wheel actuator 40 below an expected performance of the road wheel actuator 40. In an example, the performance of the road wheel actuator 40 may be the steering torque applied by the road wheel actuator 40 based on instructions for a steering operation.

A steering operation, in this disclosure means a time in which a steering wheel 30 is turned such that the steerable wheels 46 should be (and, in normal operation, are) actuated to move to a steering angle other than zero such that the vehicle 10 turns based on the steering wheel angle of the steering wheel 30.

The expected performance of the road wheel actuator 40 is the expected minimum torque applied by the road wheel actuator 40 during the steering operation. The expected minimum torque may be determined based on a vehicle type as the minimum torque expected to be applied during the turning operation when the vehicle 10 is operating within specified operating limits with no fault condition in the steer-by-wire system. In a case that the performance of the road wheel actuator 40 is operating within an expected range, the feedback torque adjustment factor may be, for example, set to unity. In a case that the road wheel actuator 40, due to operating conditions or a fault condition, is providing a steering torque that is below an expected steering torque, the feedback torque adjustment factor may be set to a value greater than unity. In this manner, the feedback torque may indicate to the operator that the road wheel actuator 40 is exhibiting a performance loss.

As one example, to determine the steering wheel feedback torque, the computer 20 may multiply the steering torque by the feedback torque adjustment factor. A scaling factor may additionally be used to adjust the steering wheel feedback torque to an expected range of torques. That is, in one example $$T_{swf} = (A)(T_s)(AF_{fT})$$ Eq. 1 where:
T$_{swf}$ is the steering wheel feedback torque, i.e., a torque applied to the steering wheel to provide feedback to the feedback to the vehicle operator;
A is a scaling factor to adjust the steering wheel feedback torque to within an expected range comparable, for example, to that experience in vehicles that include power assisted steering;
T$_s$ is the steering torque, i.e., the torque experienced by the steerable wheels during turning; and
AF$_{fT}$ is the feedback torque adjustment factor, i.e., a unitless value based on the deviation of performance of the road wheel actuator 40 below an expected performance.

A road wheel actuator 40 includes a computer such as an electronic control unit UCU) or the like, programmed to communicate on a vehicle bus and, for example, send commands to and/or receive commands from the computer 20. The road wheel actuator 40 includes an electromechanical actuator coupled to the steering rack 44. Based on the commands, the road wheel actuator 40 applies a steering torque to the steering rack 44 to steer the steerable wheels 46. As used herein, steering the steerable wheels 46 means to turn the steerable wheels 46 such that the wheels 46 rotate about vertical axes defined by a line through the diameter of the respective wheel 4, i.e., turn to one side or the other of the vehicle 10. For example, in a case that the operator turns the steering wheel 30 clockwise, the computer 20 receives data from the steering sensor 32 that the operator is steering the car to the right. Based on the data, the computer 20 sends instructions to the road wheel actuator 40. Based on the instructions, the road wheel actuator 40 applies a steering torque to the steering rack 44 such that the steerable wheels 46 are turned to the right.

Road wheel actuator sensors 42 include a computer such as an electronic control unit (ECU) or the like, programmed to communicate on a vehicle bus and, for example, send commands to and/or receive commands from the computer 20. The road wheel actuator sensors 42 provide data about the steering rack 44 and steerable wheels 46 to the computer 20.

For example, the road wheel actuator sensors 42 may include wheel-speed sensors for the steerable wheels 46, position sensors for detecting a position of the steering rack 44, wheel angle sensors to determine an angle of the steerable wheels 46 relative to a longitudinal axis of the vehicle 10 (straight), a current sensor for detecting an amplitude of electrical current through the electromechanical actuator in the road wheel actuator 40, torque sensors for detecting a torque experienced by the steering rack 44 or steerable wheels 46, etc.

Additionally, the road wheel actuator sensors 42 can detect operating conditions related to road wheel actuator 40. Operating conditions related to the road wheel actuator 40 include conditions in the environment or in the vehicle 10 that impact the operation of the road wheel actuator 40. For example, environmental conditions may include a temperature of the environment, either external to the vehicle 10 or within the vehicle 10 near the road wheel actuators 40, precipitation, road conditions, etc. Vehicle 10 conditions that may impact the operation of the road wheel actuator 40 include the supply voltage above a maximum specified voltage (overvoltage), supply voltage below a minimum specified level (under voltage), activation of current limiting (current requirement of the actuators exceeds specified maximum current limit, possibly due to an internal fault or an excessive load), a temperature of the road wheel actuator 40 exceeding a maximum specified level (overtemperature), excessive load (typically would result in an overtemperature condition and/or a condition that triggers current limiting).

The steering rack 44 couples the road wheel actuator 40 to the steerable wheels 46 such that the angle of the steerable wheels 46 can be controlled by the road wheel actuator 40, and may be, for example, a four-bar linkage. The position of the steering rack 44 determines the actual wheel angle of the steerable wheels 46. The actual wheel angle of the steerable wheels 46 at a time means the angle of the steerable wheels 46 at the time relative to straight. The term "straight" as used herein in reference to the angle of the steerable wheels 46 means a direction of the steerable wheels 46 that directs the vehicle 10 along the longitudinal axis of the vehicle 10. Translational motion of the steering rack 44 results in turning the steerable wheels 46 toward one side or the other of the vehicle 10. The steering rack 44 transforms the steering torque from the road wheel actuator 40 into mechanical motion to turn the steerable wheels 46. The steering rack 44 further supports the steerable wheels 46.

The vehicle 10 includes vehicle speed sensors 50. The vehicle speed sensors 50 can include sensors that detect vehicle location(s) over time such as a global positioning system (GPS), inertial measurement units (IMU), and magnetometers. The vehicle speed sensors 50 can further include wheel speed sensors such as rotary encoders or Hall effect sensors that detect a speed of rotation of the steerable wheels 46 or other wheels on the vehicle 10. The vehicle speed sensors 50 collect vehicle speed data indicating the vehicle 10 speed and provide the vehicle speed data to the computer 20. The vehicle speed sensors 50 can include an electronic control unit (ECU) or the like that is in communication with, receives input from and provides output to the computer 20.

Figure 2:
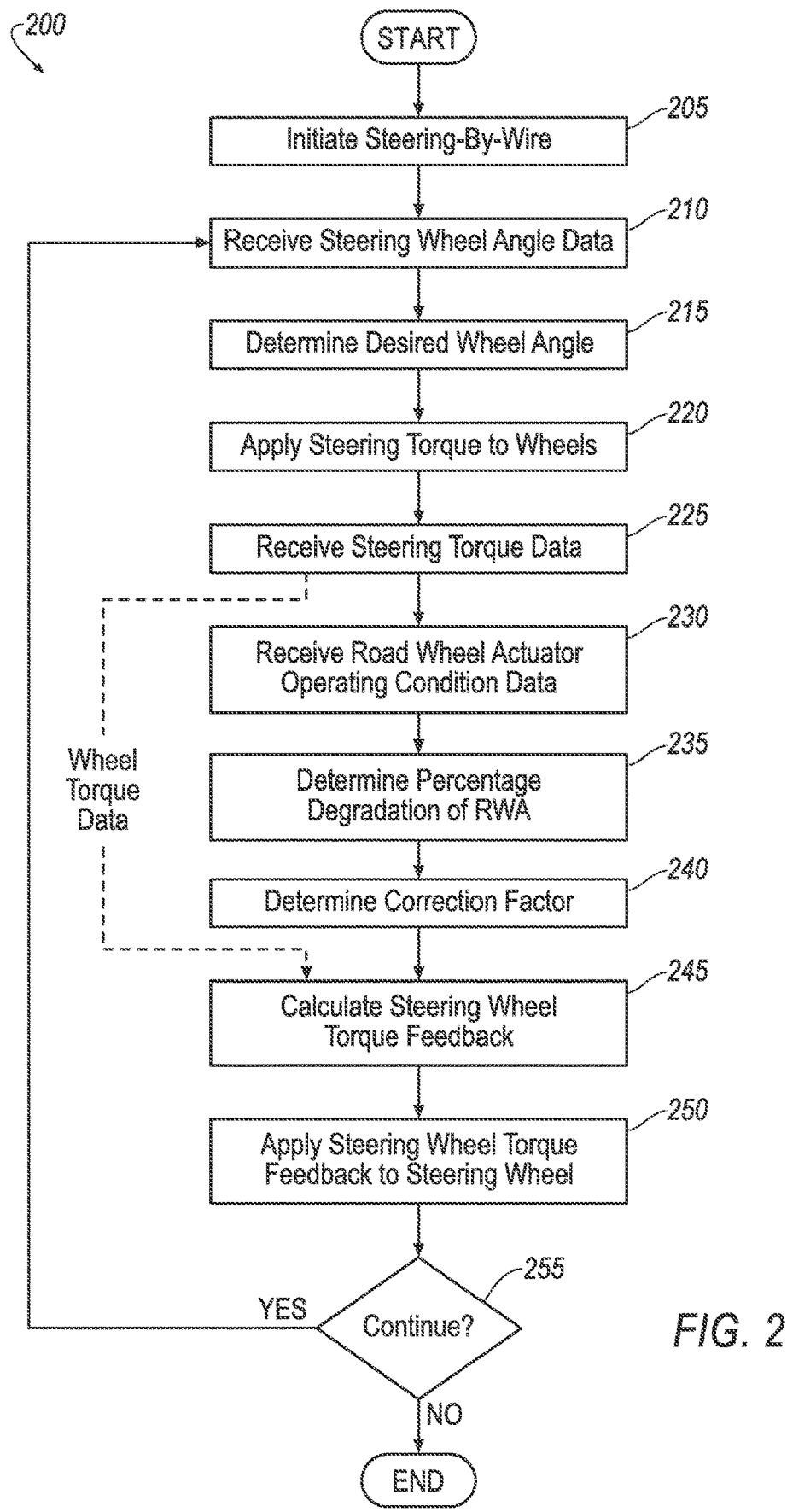
FIG. 2 is a diagram of an example process for applying feedback torque to a steering wheel in a steer-by-wire system.

FIG. 2 is a diagram of an example process 200 for applying steering wheel feedback torque to the steering wheel 30. The computer 20 initiates steering-by-wire. The memory of the computer 20 stores executable instructions for performing the steps of the process 200.

As a general and non-limiting overview provided for the convenience of reader, in the process 200, the computer 20 receives steering input from the steering wheel 30 via the steering sensors 32. Based on the steering input, the computer 20 instructs the road wheel actuator 40 to turn the steerable wheels 46 via the steering rack 44. The road wheel actuator sensors 42 sense the steering torque on the steerable wheels 46 and provide steering torque data to the computer 20. The road wheel actuator sensors 42 further collect operating data indicating the operating conditions of the road wheel actuator 40 and. The computer 20 specifies a steering wheel feedback torque to apply to the steering wheel 30 based on the steering torque experienced by the steerable wheels 46. In the case that the operating data indicates that the road wheel actuator 40 is operating below a specified range, the computer 20 adjusts the steering wheel feedback torque to include or be modified by a factor based on the performance loss of the road wheel actuator 40.

The process 200 begins in a block 205. In the block 205, the computer 20 initiates steering-by-wire. Initiating steering-by-wire means activating the systems that electrically couple input from a human or virtual driver to the road wheel actuators 40 such input from the human or virtual driver can control an angle of the steerable wheels 46. Based, for example, on receiving a signal indicating an ignition of the vehicle 10, the computer 20 powers up and/or otherwise activates the steering sensors 32, steering wheel torque actuator 34, road wheel actuator 40, road wheel actuator sensors 42 and other vehicle components utilized for executing steer-by-wire. The process 200 continues in a block 210.

In the block 210, the computer 20 receives steering data from the steering sensors 32 indicating a steering wheel angle. As discussed above, the steering wheel angle is typically the angle of the steering wheel relative to the straight-away position. The process 200 continues in a block 215.

In the block 215, the computer 20, based on the steering data, determines a desired wheel angle relative to straight-away. The computer 20 sends instructions to the road wheel actuator 40 to apply a steering torque to the steering rack 44 to turn the steerable wheels to the desired steerable wheel angle. The process 200 continues in a block 220.

In the block 220, the road wheel actuator 40 receives the instructions sent by the computer 20. Based on the instructions, the road wheel actuator 40 applies the steering torque to the steering rack 44. Through translational motion, the steering rack 44 transmits the applied steering torque to the steerable wheels 46. The steerable wheels 46 begin to turn in response to the steering torque. The process 200 continues in a block 225.

In the block 225, the road wheel actuator sensors 42 detect the steering torque. For example, the road wheel actuator sensors 42 may measure an operating voltage and current of the road wheel actuator 40 and determine the steering torque generated by the road wheel actuator 40 based on these electrical parameters. As another example, the road wheel actuator sensors 42 may include a torque sensor that directly measures a torque transmitted by the road wheel actuator 40 to the steering rack 44. The road wheel actuator sensors 42 provide steering torque data to the computer 20 indicating the steering torque applied to the steerable wheels 46. The process 200 continues in a block 230.

In the block 230, the road wheel actuator sensors 42 further collect road wheel actuator operating data. The road wheel actuator operating data includes data indicating operating conditions, i.e., values of physical phenomena arising during operation of the vehicle 10, for the road wheel actuator 40. Operating conditions for the road wheel actuator 40 may include the operating voltage, the operating current, the operating temperature, an operating speed of an electric motor generating the steering torque, the actual wheel angle of the steerable wheels 46, a wheel angle velocity (turning rate from side-to-side) of the steerable wheels 46, and any other parameters that may impact or indicate a level of performance of the road wheel actuator 40. The process 200 continues in a block 235.

In the block 235, the computer 20, based on the operating data, determines a percentage degradation in the performance of the road wheel actuator 40 relative to an expected level of performance. The expected level of performance of the road wheel actuator 40 may be a steering torque applied to the steering rack 44 within an expected torque range. The expected torque range may be based, for example, on an operating motor speed torque curve for an actuator motor included in the road wheel actuator 40.

In some cases, the computer 20 may, based on detected operating conditions, send instructions to reduce the performance of the road wheel actuator 40 below the expected level. For example, the computer 20 may detect that the supply voltage level provided to the road wheel actuator 40 is above a maximum specified level. To prevent damage to the road wheel actuator 40, the computer 20 may send instructions limiting a supply current supplied to the road wheel actuator 40 to a reduced maximum limit. The reduced maximum limit may be a limit determined by the computer 20 to be a safe limit based on the detected supply voltage. The current limit may cause the road wheel actuator 40 to perform at a reduced level, e.g. 20%, below the expected level.

In other cases, the road wheel actuator 40, due to one or more operating conditions, may be unable to perform at the expected level. For example, a supply voltage to the road wheel actuator 40 may be below specification. The road wheel actuator 40 may operate, but may deliver a steering torque that is below the expected level. In this case, the computer 20 may, based on the steering torque data, determine an amount of reduction, e.g. as a percentage obtained by dividing actual with expected steering torque, in performance of the road wheel actuator 40 relative to the expected performance. The process 200 continues in a block 240.

In the block 240, the computer 20 specifies a feedback torque adjustment factor. The feedback torque adjustment factor is an adjustment value used to adjust the steering wheel feedback torque applied to the steering wheel to account for reduced performance of the road wheel actuator 40. In a case that the road wheel actuator 40 is operating within the expected range, the feedback torque adjustment factor may be unity. In a case that the performance of the road wheel actuator 40 is reduced, the feedback torque adjustment factor may be increased. As one example, the feedback torque adjustment factor may set according to $$AF1f_T = 1/1-x \qquad \text{Eq. 2}$$

where:
  $AF1f_T$ is a first feedback torque adjustment factor;
  x is a percentage reduction in the performance of the road wheel actuator 40 relative to an expected performance.

As another example, the feedback adjustment factor may be set as $$AF2f_T = 1 + x \qquad \text{Eq. 3}$$

where:
$AF2f_T$ is a second feedback torque adjustment factor; and
x is a percentage reduction in the performance of the road wheel actuator 40 relative to an expected performance.

Following the block 240, the process 200 continues in a block 245. In the block 245, the computer 20 specifies a steering wheel feedback torque feedback based on the steering torque detected by road wheel actuator sensors 42 and the feedback torque adjustment factor. In one example, the steering torque feedback may be specified to be the product of the steering torque feedback, the feedback torque adjustment factor and the scaling factor. For example, as noted above, the steering wheel feedback torque may be calculated according to equation 1 (provided above and repeated here for convenience).

$$T_{swf} = (A)(T_s)(AF_{fT}) \qquad \text{Eq. 1}$$

Note that $AF_{fT}$ may be calculated, for example, based on equation 2 or equation 3 above.

The computer 20 may adjust the scaling factor A based on factors such as vehicle speed and steering speed. Steering speed, for purposes of this disclosure, may be defined as the rate of change of the steering angle as detected by the steering sensors 32. Alternatively, steering speed may be defined as the rate of change of the actual wheel angle of the steerable wheels 46. For example, the scaling factor A may be reduced as the speed of the vehicle 10 increases or as the steering speed increases. These functions (relationship between A and vehicle speed, relationship between A and steering speed), may be determined empirically and/or using simulations during vehicle development based on a desired feel, i.e., based on desired steering wheel 40 feedback torque, of the vehicle 10 while driven. They may be stored in one or more tables in the computer 20. The functions would typically be monotonic and may be non-linear.

Linear or non-linear functions relating the scaling factor A to values other than vehicle speed and steering speed may be used. For example, in addition to or as an alternative to a function including vehicle speed and/or steering speed, a table may be generated and stored in the computer 20 that specifies the steering wheel feedback torque for different combinations of the steering torque and the feedback torque adjustment factor.

Following the block 245, the process 200 continues in a block 250. In the block 250, the computer 20 applies, via the steering wheel torque actuator 34, the steering wheel feedback torque to the steering wheel 30. That is, the computer 20 sends one or more commands to the steering wheel torque actuator 34. Based on the command(s), the steering wheel torque actuator 34 generates and applies the steering wheel feedback torque to the steering wheel 30. The process 200 then continues in a block 255.

In the block 255, the computer 20 determines whether the vehicle 10 continues to operate. In the case that that the vehicle 10 continues to operate, the process 200 continues in the block 210. If the vehicle 10 has stopped operating, for example, based on the ignition being turned off, the process 200 ends.

Figure 3B:
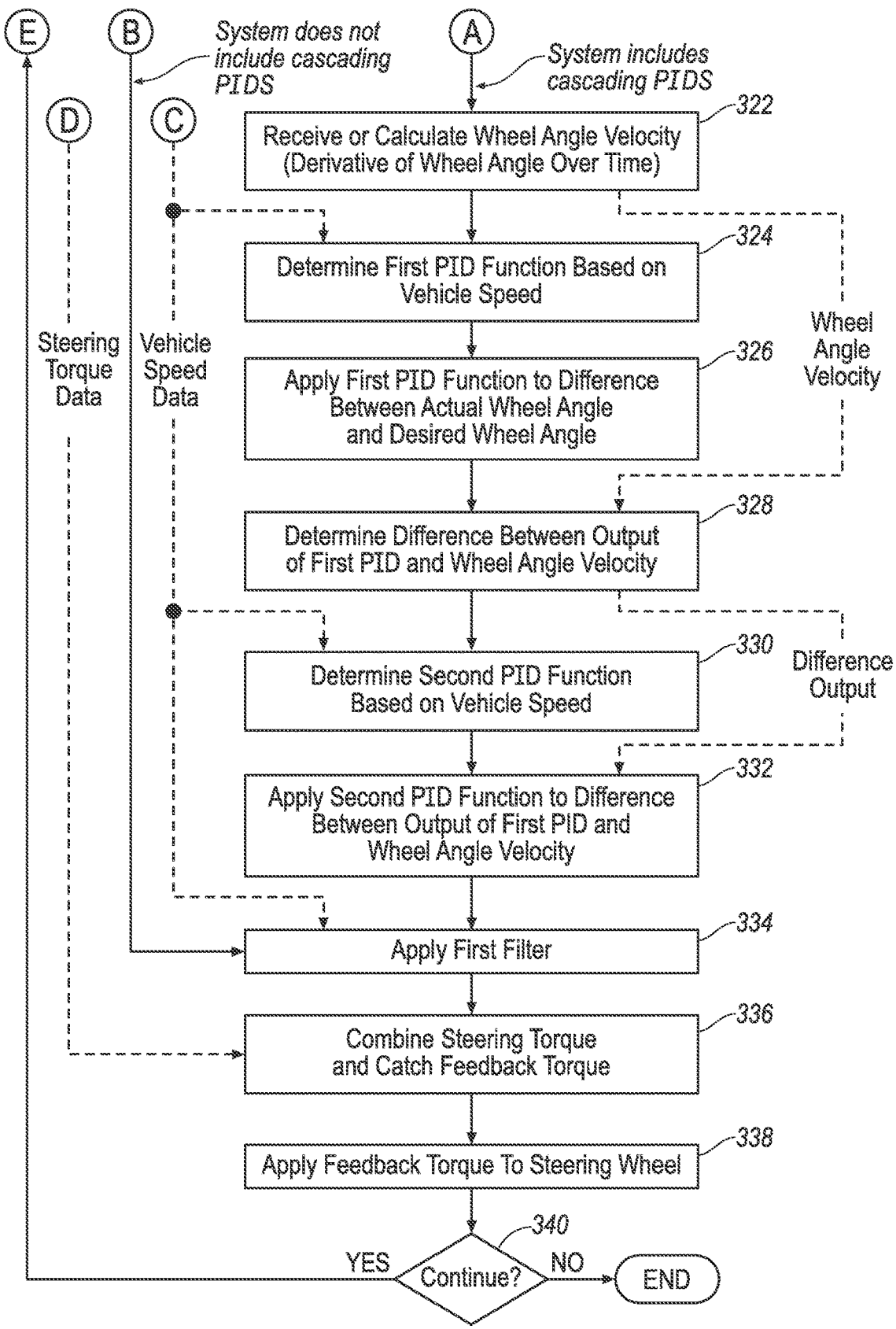

FIGS. 3A and 3B are a diagram of an example process 300 for applying steering wheel feedback torque to a steering wheel 30 in a steer-by-wire system. The computer 20 initiates steering-by-wire. The memory of the computer 20 stores executable instructions for performing the steps of the process 300.

As a general and non-limiting overview provided for the convenience of reader, in the process 300, the computer 20 receives steering input from the steering wheel 30 via the steering sensors 32. Based on the steering input, the computer 20 instructs the road wheel actuator 40 to turn the steerable wheels 46 via the steering rack 44. The road wheel actuator sensors 42 sense a steering torque applied to the steerable wheels 46, and provide the steering torque data to the computer 20. The road wheel actuator sensors 42 further collect operating data indicating the actual wheel angle and wheel angle velocity (i.e., turning rate measured from side-to-side) of the steerable wheels 46. The computer 20 specifies a steering wheel feedback torque to apply to the steering wheel 30 based at least on the steering torque and on a difference between a desired wheel angle and an actual wheel angle. The computer 20 may further include factors such as the vehicle velocity and the wheel angle velocity in specifying the steering wheel feedback torque. The computer 20 then applies, via the steering wheel torque actuator 34, the feedback torque to the steering wheel 30. In an example, the computer 20 applies cascading proportional-integral-derivative controllers (PID). The PID is a control loop feedback mechanism often used in industrial control systems that substantially continuously calculates an error value as the difference between a desired setpoint and a measured process variable and applies a correction based on proportional, integral and derivative terms.

The process 300 begins in a block 302. In the block 302, the computer 20 initiates steering-by-wire. The process 300 then continues in a block 304.

In the block 304, the computer 20 receives steering data from the steering sensors 32 indicating a steering wheel angle. The process 300 continues in a block 306.

In the block 306, the computer 20, based on the steering data, determines a desired wheel angle relative to the longitudinal axis of the vehicle 10. The computer 20 sends a command to the road wheel actuator 40 to apply a steering torque to the steering rack 44 to turn the steerable wheels 46 to the desired wheel angle. The process 300 then continues in a block 308.

In the block 308, the road wheel actuator 40 receives the instructions sent by the computer 20. Based on the instructions, the road wheel actuator 40 applies the steering torque to the steering rack 44. Through translational motion, the steering rack 44 transmits the steering torque to the steerable wheels 46. The steerable wheels 46 turn in response to the steering torque. The process 300 then continues in a block 310.

In the block 310, the road wheel actuator sensors 42 detect the steering torque. For example, the road wheel actuator sensors 42 may measure a supply voltage and supply current of the road wheel actuator 40 and determine the steering torque generated by the road wheel actuator 40 based on these electrical parameters. As another example, the road wheel actuator sensors 42 may include a torque sensor that directly measures a torque transmitted by the road wheel actuator 40 to the steering rack 44. The road wheel actuator sensors 42 provide steering torque data to the computer 20 indicating the steering torque applied to the steerable wheels 46. The process 300 then continues in a block 312.

In the block 312, the computer 20 receives wheel angle data. The road wheel actuator sensors 42 measure an actual wheel angle of the steerable wheels 46 relative to the longitudinal axis of the vehicle 10 and provide the wheel angle data to the computer 20. The process 300 then continues in a block 314.

In the block 314, the computer 20 determines a difference between the desired wheel angle of the steerable wheels 46 and the actual wheel angle of the steerable wheels 46. The process 300 then continues in a block 316.

In the block 316, the computer 20 receives vehicle speed data from the vehicle speed sensors 50. Based on the vehicle speed data, the computer 20 determines the vehicle's speed. In a case that the steer-by-wire system includes cascading proportional-integral-derivative controllers (PIDs), the process 300 continues in a block 322. In a case where the steer-by-wire system does not include cascading PIDs, the process 300 then continues in a block 318.

In the block 318, the computer 20, based on the vehicle speed, determines a gain factor to apply to the difference between the desired wheel angle and the actual wheel angle. The gain can be used to adjust a level of a torque applied to the steering wheel based on the difference between the desired wheel angle and the actual wheel angle. The gain can be adjusted based on a speed of the vehicle. These function between the gain and the vehicle speed may be determined empirically and/or using simulations during vehicle development based on a desired feel, i.e., based on desired steering wheel 40 feedback torque, of the vehicle 10 while driven. They may be stored in one or more tables in the computer 20. The functions would typically be monotonic and may be non-linear. In an example, the gain would be decreased as a function of vehicle speed. In this case, the feedback torque due to the difference between the desired wheel and the actual wheel angle would be higher at lower vehicle speed than at higher vehicle speed. The process 300 then continues in a block 320.

In the block 320, the computer 20 applies the gain factor to the difference between the desired wheel angle and the actual wheel angle to generate an unfiltered value for a catch feedback torque component (i.e., the difference between the desired wheel angle and the actual wheel angle). The process 300, for the case that the system does not include cascading PIDs, then continues in a block 338.

In the block 322, which follows from the block 316 in the case that the system includes cascading PIDs, the computer 20 receives or calculates the wheel angle velocity (turning rate). The wheel angle velocity can be defined as the derivative of the wheel angle over time. In a case that the road wheel actuator sensors 42 includes a wheel angle velocity sensor, the computer 20 receives wheel angle velocity data from the wheel angle velocity sensor. Alternatively, in a case that the road wheel actuator sensors 42 includes a wheel angle (position) sensor, the computer 20 can receive two or more actual wheel angles at two or more respective times, and based on the actual wheel angles and the respective times, determine the wheel angle velocity. The wheel angle velocity for a time period, is the change in the actual wheel angle divided by the time period. The process 300 then continues in a block 324.

In the block 324, the computer 20 determines a first PID function based on the vehicle velocity. The PID function is a control loop feedback mechanism. Its input is an error term (angle error in the case of this disclosure) that the controller is configured to reduce by commanding the controller output (in this case the torque applied to the steering wheel 30 due to the difference between the desired wheel angle and the actual wheel angle) to the steering wheel torque actuator 34. The P portion of the controller gain reduces the error between the desired set point and the actual set point. The I portion reduces the integral/accumulation of the same error over tie and the D portion reduces the rate change differences of the error term. These gain factors (P, I, and D), similar to the gain discussed above in block 318, can be tuned based on vehicle speed. For example, each of these factors can reduced with higher vehicle speed in order to reduce an influence of the torque on steering feel at higher vehicle speeds. The process 300 then continues in a block 326.

In the block 326, the computer 20 applies the first PID function to the difference between the actual wheel angle a desired wheel angle (generated in block 314). The process 300 then continues in a block 328.

In the block 328, the computer 20 determines a difference between the output of the first PID (output of block 326) and the wheel angle velocity (output of block 322). The process 300 then continues in a block 330.

In the block 330, the computer 20 determines a second PID function based on the vehicle velocity. The second PID functions similarly to the PID described in block 324 above. The error term in this case is the difference between the error factor from the first PID and the wheel angle velocity. As with the first PID, the P, I and D gain factors may be set according to a feel desired at the steering wheel 30, and, for example, reduced with increasing vehicle speed. While the set-point tracking performances are almost identical between a single PID and cascaded PID controls, the later typically performs better in rejecting disturbances caused due to internal set point impulses or external factors. The process then continues in a block 332.

In the block 332, the computer 20 applies the second PID function to the difference between the output of the first PID and the wheel angle velocity (output of block 328). The process 300 then continues in a block 334.

In the block 334, the computer 20 applies the first filter to the output of the second PID function (output of block 332). The computer 20 may adjust the filter characteristic of the first filter based on the vehicle speed. The first filter may be, for example, a first order low-pass filter. The corner frequency may be set such that the feedback torque due to a difference between the desired wheel angle and actual wheel angle is passed during typical steering maneuvers, but blocked for higher speed steering adjustments such as steering adjustments for evasive maneuvers or sport driving. In some cases, the first filter may be omitted from the process 300. That is, the first filter characteristic may be unity. The output of the first filter is a filtered version of the catch feedback torque. The process 300 then continues in a block 336.

In the block 336, the computer 20 combines the steering torque data (output of block 310) and the catch feedback torque data (output of block 334) to generate an unfiltered version of the feedback torque. As an example, the computer 20 may add the catch feedback torque to the steering torque to generate the feedback torque. As an example, the function of block 336 may be $$T2_{swf} = (B)(T_s) + (C)(T_{cf}) \qquad \text{Eq. 4}$$

where:
 $T2_{swf}$ is the steering wheel feedback torque;
 B and C are gain factors selected to adjust an overall level of the SW feedback torque applied to the steering wheel 30 to a level that corresponds, for example, to driver experiences with conventional power assisted steering vehicles;
 The steering torque $T_s$ is the torque experienced by the steerable wheels during a turning operation; and $T_{cf}$ is the catch feedback torque, which indicates a performance of the road wheel actuator 40 below an expected performance.

The process 300 then continues in a block 338.

In the block 338, the computer 20 applies, via the steering wheel torque actuator 34, the steering wheel feedback torque to the steering wheel 30. That is, the computer 20 sends a command to the steering wheel torque actuator 34. Based on the command, the steering wheel torque actuator 34 generates the steering wheel feedback torque and applies the torque to the steering wheel 30. The process 300 then continues in a block 340.

In the block 340, the computer 20 determines whether the vehicle 10 continues to operate. In the case that that the vehicle 10 continues to operate, the process 300 continues in the block 304. If the vehicle 10 has stopped operating, for example, based on the ignition being turned off, the process 300 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an onboard vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Use of "in response to" and "upon determining" indicates a causal relationship, not merely a temporal relationship. Many modifications and variations of the present disclosure are possible in light of the above teachings, and the disclosure may be practiced otherwise than as specifically described.

What is claimed is:

1. A system comprising:
a computer including a processor, and a memory storing instructions executable by the processor such that the computer is programmed to:
specify, while a vehicle is turning, a feedback torque based on a steering torque applied to a steering rack and a difference between a desired angle and an actual angle of vehicle steerable wheels relative to straight;
apply a first proportional-integral-derivative control function to the difference between the desired angle and the actual angle of the vehicle steerable wheels relative to straight, wherein specifying the feedback torque is further based on an output of the first proportional-integral-derivative control function; and
actuate feedback torque to a vehicle steering wheel.

2. The system of claim 1, further comprising an actuator to apply the feedback torque to the steering wheel.

3. The system of claim 1, wherein the computer is further programmed to specify the feedback torque based on a vehicle speed.

4. The system of claim 1, wherein the computer is programmed to specify the feedback torque further based on a wheel angle velocity of the vehicle steerable wheels.

5. The system of claim 4, wherein the computer is further programmed to:
receive respective actual angles of the vehicle steerable wheels relative to straight at two or more times; and
determine the wheel angle velocity of the vehicle steerable wheels based on the respective actual angles relative to straight at the two or more times.

6. The system of claim 1, wherein the computer is further programmed to:
determine a difference between a wheel angle velocity of the vehicle steerable wheels and the output of the first proportional-integral-derivative control function, wherein specifying the feedback torque is based on the difference between the wheel angle velocity of the vehicle steerable wheels and the output of the first proportional-integral-derivative control function.

7. The system of claim 6, wherein the computer is further programmed to:
apply a second proportional-integral-derivative control function to the difference between the wheel angle velocity and the output of the first proportional-integral-derivative control function, wherein specifying the feedback torque is based on an output of the second proportional-integral-derivative control function.

8. The system of claim 1, wherein the computer is further programmed to:
receive a steering angle of the steering wheel relative to straight; and
determine the desired angle of the vehicle steerable wheels relative to straight based on the steering angle of the steering wheel relative to straight.

9. The system of claim 8, further comprising:
an actuator configured to apply the steering torque to the steering rack; wherein the computer is further programmed to:
command the actuator to apply the steering torque to the steering rack based on the desired angle of the vehicle steerable wheels relative to straight.

10. A method comprising:
specifying, by a computer, while a vehicle is turning, a feedback torque based on a steering torque applied to a steering rack and a difference between a desired angle and an actual angle of vehicle steerable wheels relative to straight;
applying a first proportional-integral-derivative control function to the difference between the desired angle and the actual angle of the vehicle steerable wheels relative to straight, wherein specifying the feedback torque is further based on an output of the first proportional-integral-derivative control function; and
actuating feedback torque to a vehicle steering wheel.

11. The method of claim 10, further comprising:
applying, by an actuator, the feedback torque to the steering wheel.

12. The method of claim 10, further comprising:
specifying the feedback torque based on a vehicle speed.

13. The method of claim 10, further comprising:
specifying the feedback torque further based on a wheel angle velocity of the vehicle steerable wheels.

14. The method of claim 13, further comprising:
receiving respective actual angles of the vehicle steerable wheels relative to straight at two or more times; and
determining the wheel angle velocity of the vehicle steerable wheels based on the respective actual angles relative to straight at the two or more times.

15. The method of claim 10, further comprising:
determining a difference between a wheel angle velocity of the vehicle steerable wheels and the output of the first proportional-integral-derivative control function, wherein specifying the feedback torque is based on the difference between the wheel angle velocity of the vehicle steerable wheels and the output of the first proportional-integral-derivative control function.

16. The method of claim 15, further comprising:
applying a second proportional-integral-derivative control function to the difference between the wheel angle velocity and the output of the first proportional-integral-derivative control function, wherein specifying the feedback torque is based on an output of the second proportional-integral-derivative control function.

17. The method of claim 10, further comprising:
receiving a steering angle of the steering wheel relative to straight; and determining the desired angle of the vehicle steerable wheels relative to straight based on the steering angle of the steering wheel relative to straight.

18. The method of claim 17, further comprising:

applying the steering torque to the steering torque by an actuator; and commanding the actuator to apply the steering torque to the steering rack based on the desired angle of the vehicle steerable wheels relative to straight.

* * * * *